United States Patent
Westerinen et al.

(10) Patent No.: US 8,416,066 B2
(45) Date of Patent: Apr. 9, 2013

(54) ACTIVE VIBRATIONS

(75) Inventors: William J. Westerinen, Issaquah, WA (US); Joel B. Jacobs, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 442 days.

(21) Appl. No.: 12/770,392

(22) Filed: Apr. 29, 2010

(65) Prior Publication Data

US 2011/0267182 A1    Nov. 3, 2011

(51) Int. Cl.
*H04B 3/36* (2006.01)
*G09A 5/00* (2006.01)

(52) U.S. Cl. .............. 340/407.2; 340/407.1; 345/156; 345/179

(58) Field of Classification Search .......... 340/407.1, 340/407.2; 455/556, 567; 345/158, 169, 345/173, 174, 179, 156; 178/18.05, 19.01, 178/19.02, 19.04; 400/88
See application file for complete search history.

(56) References Cited

U.S. PATENT DOCUMENTS

| | | | | |
|---|---|---|---|---|
| 5,627,348 | A * | 5/1997 | Berkson et al. | 178/19.04 |
| 6,731,270 | B2 | 5/2004 | Tosaya | |
| 6,771,254 | B2 | 8/2004 | An et al. | |
| 7,336,266 | B2 | 2/2008 | Hayward et al. | |
| 7,369,115 | B2 | 5/2008 | Cruz-Hernandez et al. | |
| 7,511,706 | B2 | 3/2009 | Schena | |
| 8,219,151 | B2 * | 7/2012 | Park et al. | 455/566 |
| 8,248,218 | B2 * | 8/2012 | Yamaya | 340/407.2 |
| 8,253,686 | B2 * | 8/2012 | Kyung et al. | 345/158 |
| 2005/0116940 | A1 | 6/2005 | Dawson | |
| 2005/0248549 | A1 | 11/2005 | Dietz et al. | |
| 2009/0135164 | A1 | 5/2009 | Kyung et al. | |
| 2010/0073304 | A1 * | 3/2010 | Grant et al. | 345/173 |

OTHER PUBLICATIONS

Poupyrev, et al., "Haptic Feedback for Pen Computing: Directions and Strategies", Retrieved at << http://violin. sonycsl.co.jp/person/poup/e-library/2004/CHI2004_pentactile.pdf >>, Conference on Human Factors in Computing Systems, CHI '04 extended abstracts on Human factors in computing systems, Apr. 24-29, 2004, pp. 4.

Iwata, Hiroo., "Pen-Based Haptic Virtual Environment", Retrieved at <<http://ieeexplore.ieee.org/stamp/stamp.jsp?tp=&arnumber=380767 >>, Proceedings of the Institute of Electrical & Electronics Engineers, Virtual Reality Annual International Symposium, 1993, pp. 287-292.

Lee, et al., "Haptic Pen: Tactile Feedback Stylus for Touch Screens", Retrieved at << http://citeseerx.ist.psu.edu/viewdoc/download?doi=10.1.1.64.3015&rep=rep1&type=pdf>>, Symposium on User Interface Software and Technology, Proceedings of the 17th annual ACM symposium on User interface software and technology, Oct. 24-27, 2004, pp. 5.

(Continued)

*Primary Examiner* — Van T. Trieu
(74) *Attorney, Agent, or Firm* — Wolfe-SBMC

(57) ABSTRACT

Active vibration techniques are described. In implementations, a selection of a type of writing surface or a type of writing implement is received, the selection made through interaction with a user interface. The selected type of writing surface or type of writing implement is simulated using vibrations of a stylus or surface of a computing device that is configured to receive one or more inputs from the stylus.

20 Claims, 7 Drawing Sheets

OTHER PUBLICATIONS

Kyung, et al., "wUbi-Pen: Windows Graphical User Interface Interacting with Haptic Feedback Stylus", Retrieved at << http://delivery.acm.org/10.1145/1410000/1401657/a42-kyung.pdf? key1=1401657&key2=8668429621&coll=GUIDE&dl=GUIDE& CFID=82963900&CFTOKEN=58534951 >>, International Conference on Computer Graphics and Interactive Techniques, ACM SIGGRAPH 2008 new tech demos, Aug. 11-15, 2008, pp. 4.

Allerkamp, et al., "Tactile Rendering: a Vibrotactile Approach", Retrieved at << http://haptex.miralab.unige.ch/public/papers/TactileRendering-aVibroTactileApproach.pdf >>, Proceedings of the HAPTEX'05 Workshop on Haptic and Tactile Perception of Deformable Objects, Dec. 2005, pp. 1-13.

Kyung, et al., "Comparison of Force, Tactile and Vibrotactile Feedback for Texture Representation Using a Combined Haptic Feedback Interface", Retrieved at << http://www.springerlink.com/content/n442822q1v981190/fulltext.pdf >>, Haptic and Audio Interaction Design, Second International Workshop, HAID 2007, Nov. 29-30, 2007, pp. 34-43.

"International Search Report", Mailed Date: Jan. 18, 2012, Application No. PCT/US2011/034108, Filed Date: Apr. 27, 2011, pp. 8.

* cited by examiner

ACTIVE VIBRATIONS

BACKGROUND

The variety of input techniques that are available for a user to interact with a computing device is ever increasing. For example, a user may use a keyboard and mouse, a touch pad, and so on to provide inputs to the computing device. Touchscreen functionality was also developed to enable a user to interact with a display device of the computing device. For example, the touchscreen functionality may detect a finger of a user and leverage this detection as an input. Likewise, the touchscreen functionality may detect a stylus and use this detection as a basis of an input for interaction with the computing device.

Traditional techniques that were employed to provide a stylus, however, were forced to balance a feel of the stylus that was generally provided by a rough surface of the display device with possibly degrading the viewing quality of the display device by including the rough surface. Therefore, these traditional techniques may result in a compromise that is less than ideal in relation to both aspects, e.g., look of the display device and feel experienced through use of the stylus.

SUMMARY

Active vibration techniques are described. In implementations, a selection of a type of writing surface or a type of writing implement is received, the selection made through interaction with a user interface. The selected type of writing surface or type of writing implement is simulated using vibrations of a stylus or surface of a computing device that is configured to receive one or more inputs from the stylus.

In implementations, an input is detected that involves pressure caused through pressing a stylus against a surface of a computing device. A behavior is determined that corresponds to the detected pressure and the behavior is simulated through vibration of the stylus or the surface of the computing device.

In implementations, an input is detected that describes pressure caused by pressing a stylus against a surface of a computing device, the input received during vibration of at least one of the stylus or the surface to provide haptic feedback. At least part of an effect of the vibration is removed from the input and one or more actions are identified that are to be performed by the computing device responsive to the input having at least part of the effect of the vibration removed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
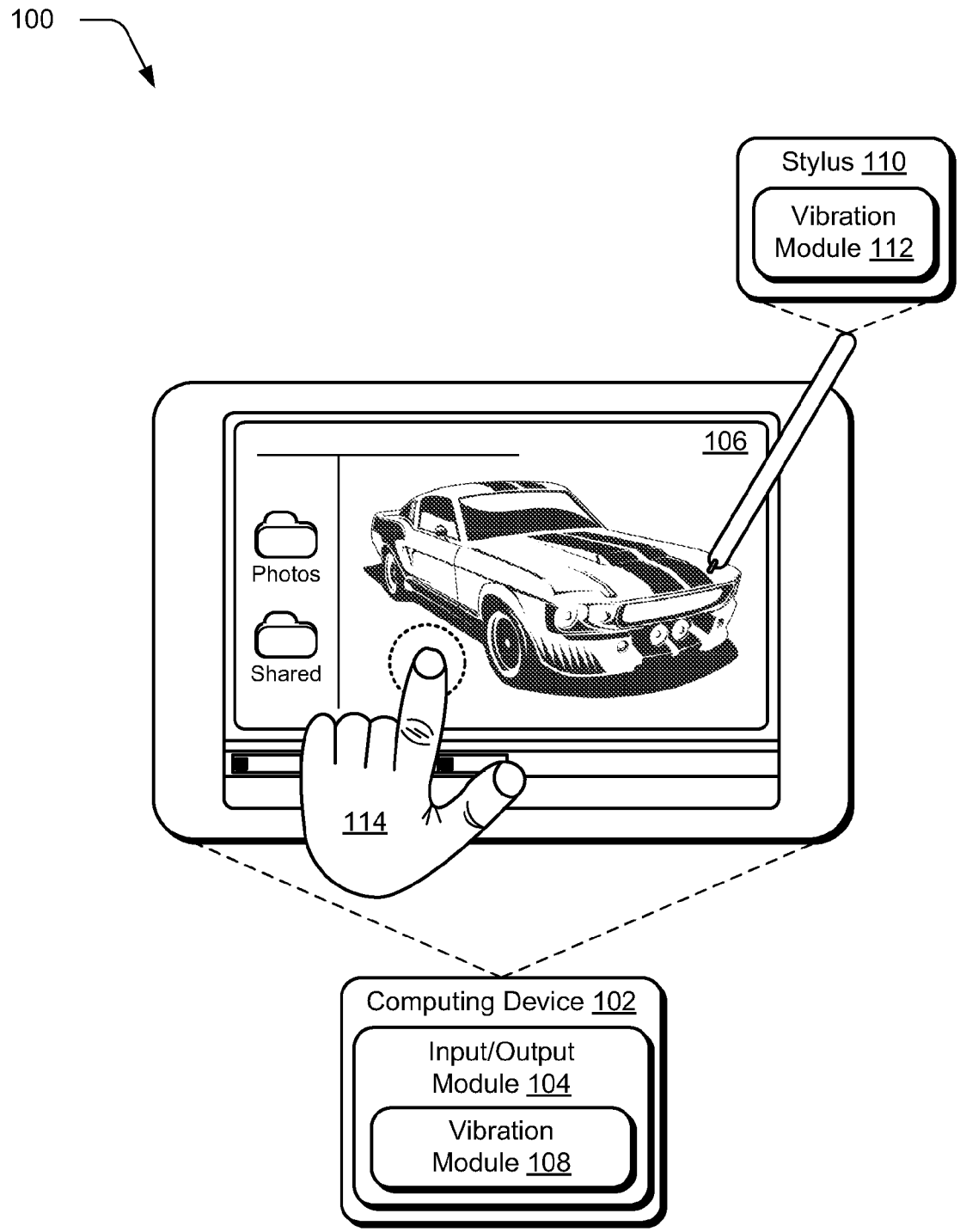
FIG. 1 is an illustration of an environment in an example implementation that is operable to employ active vibration techniques.

A variety of different techniques may be utilized to provide inputs to a computing device. One such technique involves a stylus, which was limited to approximate a single "feel" of a writing instrument due to limitations of the writing surface (e.g., a display device, writing pad, and so on) and material of the stylus. Accordingly, traditional techniques that were employed to promote a particular feel may involve providing a roughened surface, which may hinder visibility of a display device.

Active vibration techniques are described. In implementations, vibration of a stylus and/or a surface is used to provide feedback to a user. Additionally, this feedback may be adjusted through a user interface to select a particular "feel" to be encountered by the user. For example, the user interface may be configured to select a particular writing implement (e.g., a pen, pencil, marker, highlighter, fountain pen, and so on) and/or writing surface (e.g., glass, fine-grained paper, construction paper, wood, rubber, and so on). Vibration of the surface and/or the stylus may then be used to simulate the selections. Thus, in this example the user experience is customizable by a user, manufacturer, or developer of the computing device and/or stylus, further discussion of which may be found in relation to FIG. 3.

In another example, the stylus and/or surface of the computing device may be configured to detect pressure applied to the surface by the stylus. This pressure may be used as an input to provide a variety of functionality, such as to draw a line having different thicknesses. However, the surface and/or stylus may also be configured to provide feedback through vibrations, which could interfere with the input. Accordingly, in this example the computing device and/or the stylus may be configured to cancel at least part of the determined effect of the vibration from the input, further discussion of which may be found in relation to FIGS. 4 and 5.

In a further example, feedback provided by vibration of the surface of the computing device and/or the stylus is changed responsive to an input that describes pressure against the surface. For instance, a finger of a user's hand may be used to press against the surface. Responsive to the amount of pressure, the vibrations may be changed to provide haptic feedback. For instance, the input may describe a line using various amounts of pressure as a finger is dragged across the surface. Responsive to this input, the line may be drawn as having a width that varies with the pressure. Additionally, vibrations may increase as the amount of pressure increases to provide haptic feedback. A variety of other examples and instances are contemplated, further discussion of which may be found in relation to FIG. 6.

In the following discussion, an example environment is first described that is operable to employ the dynamic resistance control techniques described herein. Example procedure and illustrations of a stylus and techniques involving dynamic resistance are then described, which may be employed in the example environment as well as in other environments. Accordingly, the example environment is not limited to performing the example procedures. Likewise, the example procedures are not limited to implementation in the example environment or by the example stylus.

Example Environment

FIG. 1 is an illustration of an environment 100 in an example implementation that is operable to employ active vibration techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIGS. 2 and 7. Thus, the computing device 102 may range from full resource devices with substantial memory and processor resources (e.g., personal computers, game consoles) to a low-resource device with limited memory and/or processing resources (e.g., traditional set-top boxes, hand-held game consoles).

The computing device 102 is illustrated as including an input/output module 104. The input/output module 104 is representative of functionality relating to inputs and/or outputs of the computing device 102. For example, the input/output module 104 may be configured to receive inputs from a keyboard, mouse, to identify gestures and cause operations to be performed that correspond to the gestures, and so on. The inputs may be identified by the input/output module 104 in a variety of different ways. For example, the input/output module 104 may be configured to recognize a touch input received via touchscreen functionality of a display device 106, such as a finger of a user's hand as proximal to the display device 106 of the computing device 102.

The input/output module 104 may also be configured to provide one or more outputs, such as to provide haptic feedback through a vibration module 108. The vibration module 108 is representative of functionality of the computing device 102 to provide vibrations. For example, the vibrations may be configured to provide a different "feel" to contact of a stylus 110 with the display device 106, feedback to indicate selection of an object using the stylus 110, and so on. Additionally, the stylus 110 may also include a vibration module 112 to provide similar feedback, feel, and so on. Further, the vibration module 108 may provide vibrations responsive to a touch input provided by a finger of a user's hand 114. Thus, the vibration modules 108, 112, of the computing device 102 and stylus 110 may work in conjunction or separately to provide vibrations, further discussion of which may be found in relation to the following figure.

Figure 2:
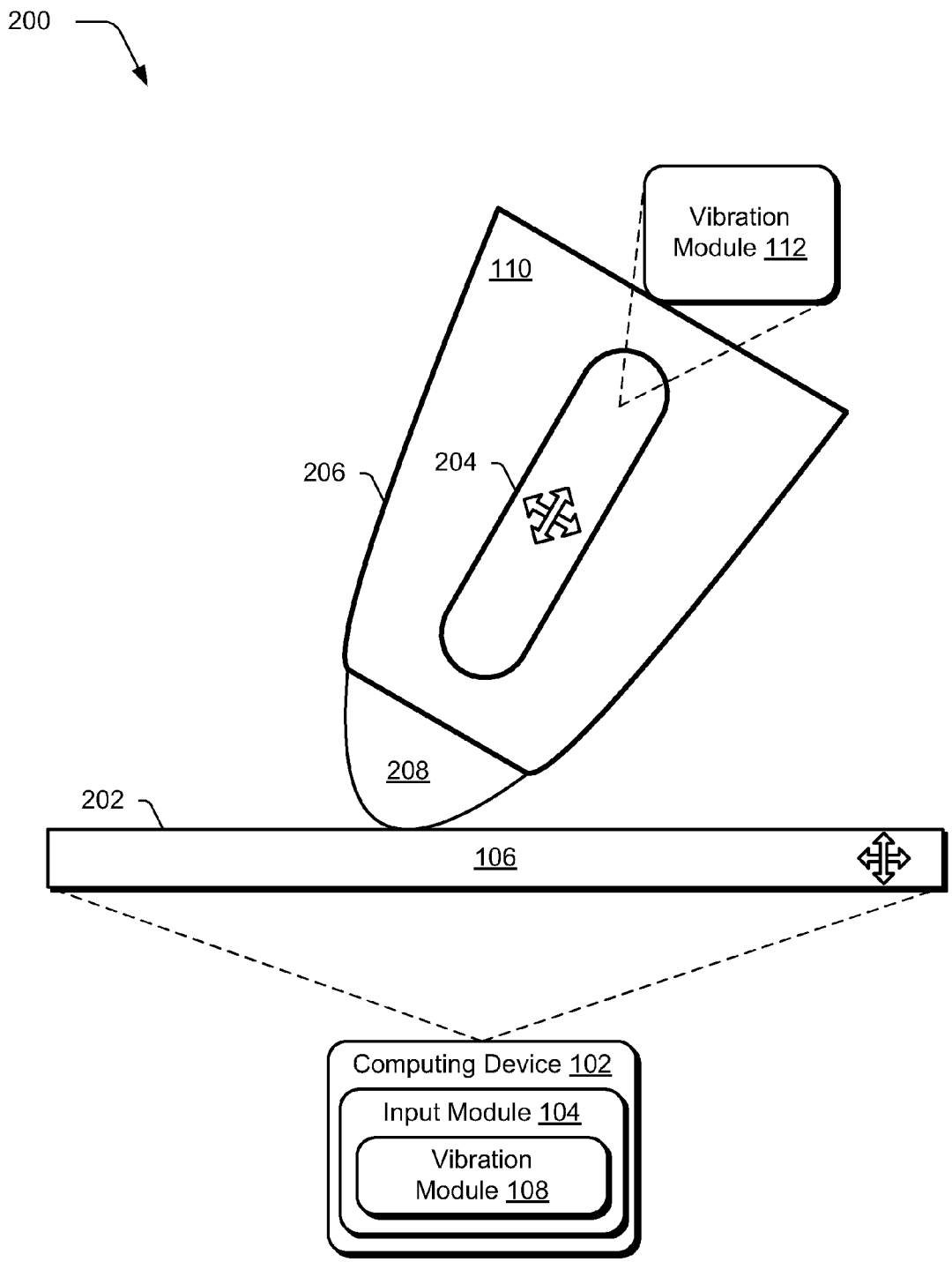
FIG. 2 is an illustration of an example system showing a stylus of FIG. 1 in a cross-sectional view and in contact with a surface, which in this instance is a display device of the computing device.

FIG. 2 illustrates an example system 200 showing the stylus 110 of FIG. 1 in a cross-sectional view and in contact with a surface, which in this instance is a surface 202 of the display device 106 of the computing device 102. In this example, the vibration module 112 is illustrated as being implemented using a weight 204 that is captured within a housing 206. The weight 204 is configured to vibrate via a mechanism (e.g., piezoelectric, mechanical cam, MEMS device, and so on) in two or more directions to create the vibrations.

Likewise, the vibration module 108 of the computing device 102 may also employ a mechanism to induce vibrations to the surface of the display device 106 in two or more directions as illustrated by the arrows. This vibration of the surface 202 may then be transmitted through a tip of the stylus 110 to transmit the vibrations indirection to a user's hand that grasps the stylus 110, directly to a finger of the user's hand 114 that is in contact with the surface 202, and so on.

The vibrations may be provided to achieve a variety of different functionality. For example, the vibrations may be dynamically adjusted (e.g., back and forth between greater and lesser relative amounts of vibration) to provide different "feels" to the use of the stylus 110. Further, the resistance may be adjusted to emulate different writing experiences, such as use of a felt-tip pen, a fountain pen, a marker, a crayon, a paint brush, and so forth on a variety of different writing surfaces, such as glass, fine-grained paper, coarse paper (e.g., construction paper), leather, rubber, wood, and so forth. In an implementation, the vibrations may also be customized by a user, such as through interaction with a user interface of the computing device 102 that is output by the input/output module 104.

Although the vibration mechanism in this example system 200 illustrates a moveable weight 204, a variety of other configurations are also contemplated. For example, a resistance mechanism may be employed that based on sonic vibrations, micro-electrical mechanical systems (e.g., MEMS devices), piezoelectric elements, and so on. Likewise, other techniques may also be employed to vibrate the surface 202 of the display device 106, such as through a rotating cam that causes movement of the surface 202, a capacitive detector to release a spring-loaded mechanism, and so on.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processing system (e.g., CPU or CPUs). The program code can be stored in one or more computer readable memory devices. The features of the active vibration techniques described below are platform-independent, meaning that the techniques may be implemented on a variety of commercial computing platforms having a variety of processors.

Example Procedures

The following discussion describes active vibration techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
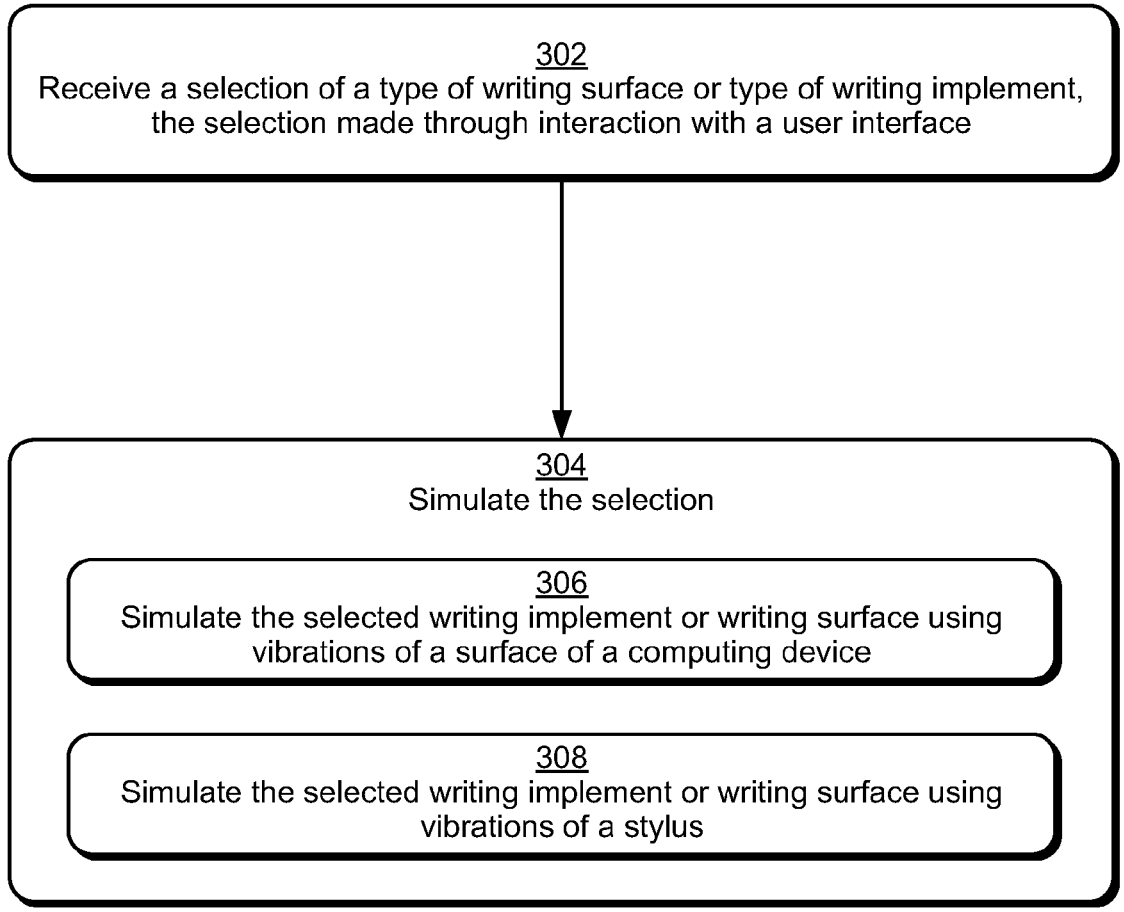
FIG. 3 depicts a procedure in an example implementation in which a writing surface and/or a writing implement are simulated through the use of vibrations.

FIG. 3 depicts a procedure 300 in an example implementation in which a writing surface and/or a writing implement are simulated through the use of vibrations. A selection is received of a type of writing surface or type of writing implement, the selection made through interaction with a user interface (block 302). For example, the user interface may be output by the computing device 102. A first portion of the user interface may be configured to include selections of types of writing implements, such as a pen, fountain pen, marker, crayon, pencil, highlighter, fine-tipped marker, and so on. A second portion of the user interface may be configured to include selection of types of writing surfaces, such as glass, wood, rubber, fine-grained paper, coarse-grained paper, and so on. A variety of other examples are also contemplated, such as a user interface that includes selections of combinations (e.g., fountain pen and fine-grained paper, pencil and sketch paper, grease pencil and glass, and so forth).

The selection is then simulated (block 304), such as by simulating the selected writing implement or writing surface using vibrations of a surface of a computing device (block 306), simulation of the selected writing implement or writing surface using vibrations of a stylus (block 308), and so on. For example, a combination of vibrations of the surface 202 and the stylus 110 may be used to simulate a combination of writing implement and surface selected.

Additionally, either one of these techniques may also be used alone, such as to vibrate the surface 202 to provide feedback to a finger of a user's hand 114. Further, vibration of one of the devices may be used to simulate a selection of another one of the devices, such as to vibrate the surface 202 to simulate a writing implement by the stylus 110, vibration of the stylus 110 to simulate a writing surface, and so on.

The vibrations may take a variety of different forms, such as to employ sinusoidal or non-sinusoidal vibrations to simulate textures, such as glass versus paper. For instance, the non-sinusoidal vibrations may be used to mimic paper fibers whereas relatively uniform sinusoidal vibrations may be used to simulate a relatively uniform surface, e.g., glass. Accordingly, the frequency and pattern of the vibrations may simulate surfaces having different textures. In another example, the velocity of the stylus may be used as a basis to adjust a frequency and/or wavelength of vibrations, e.g., as the stylus 110 is moved faster the frequency of the vibrations is also increased. A variety of other instances are also contemplated, examples of which are discussed as follows.

Figure 4:
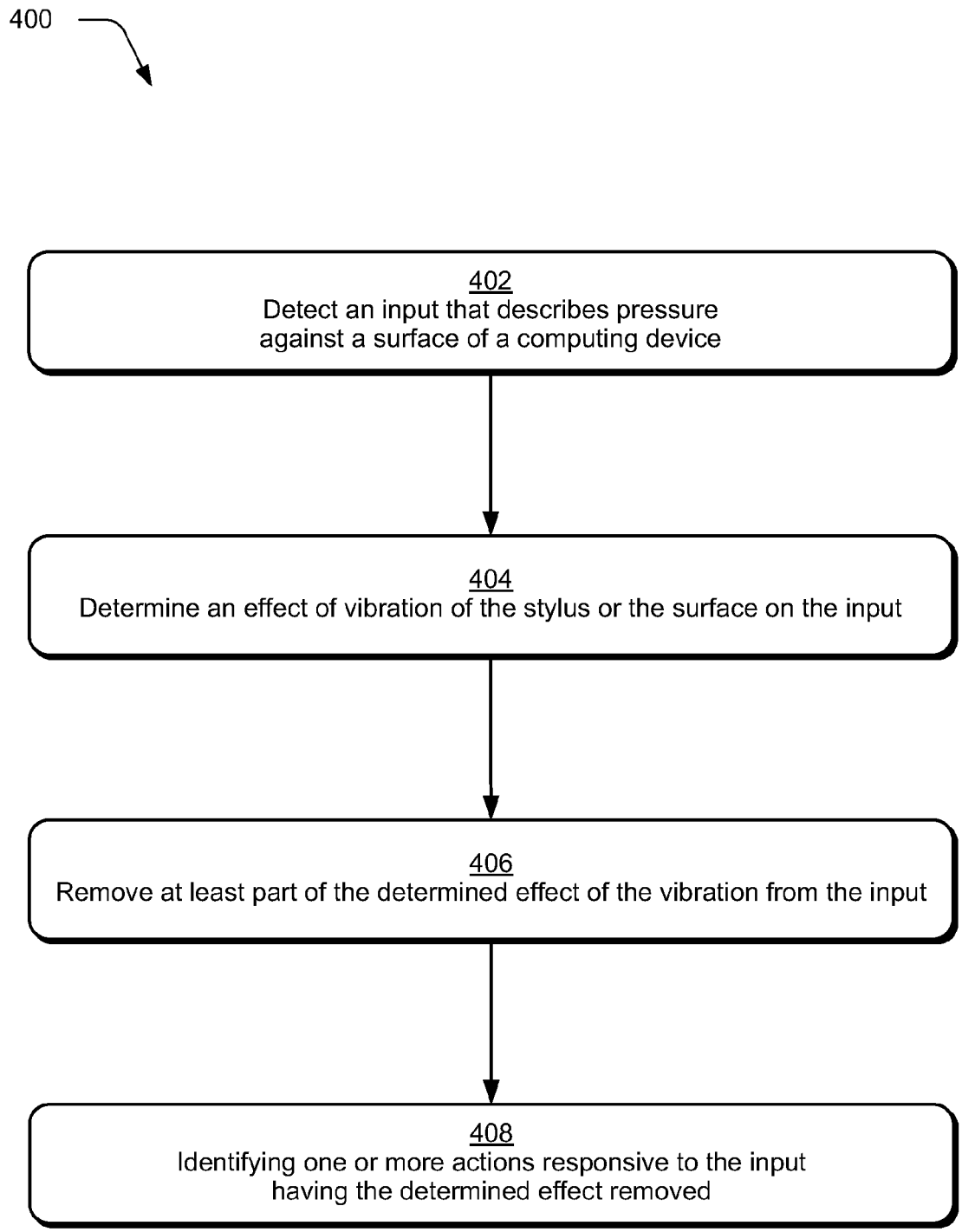
FIG. 4 depicts a procedure in an example implementation in which an effect of a vibration used to provide feedback is at least partially cancelled.
Figure 5:
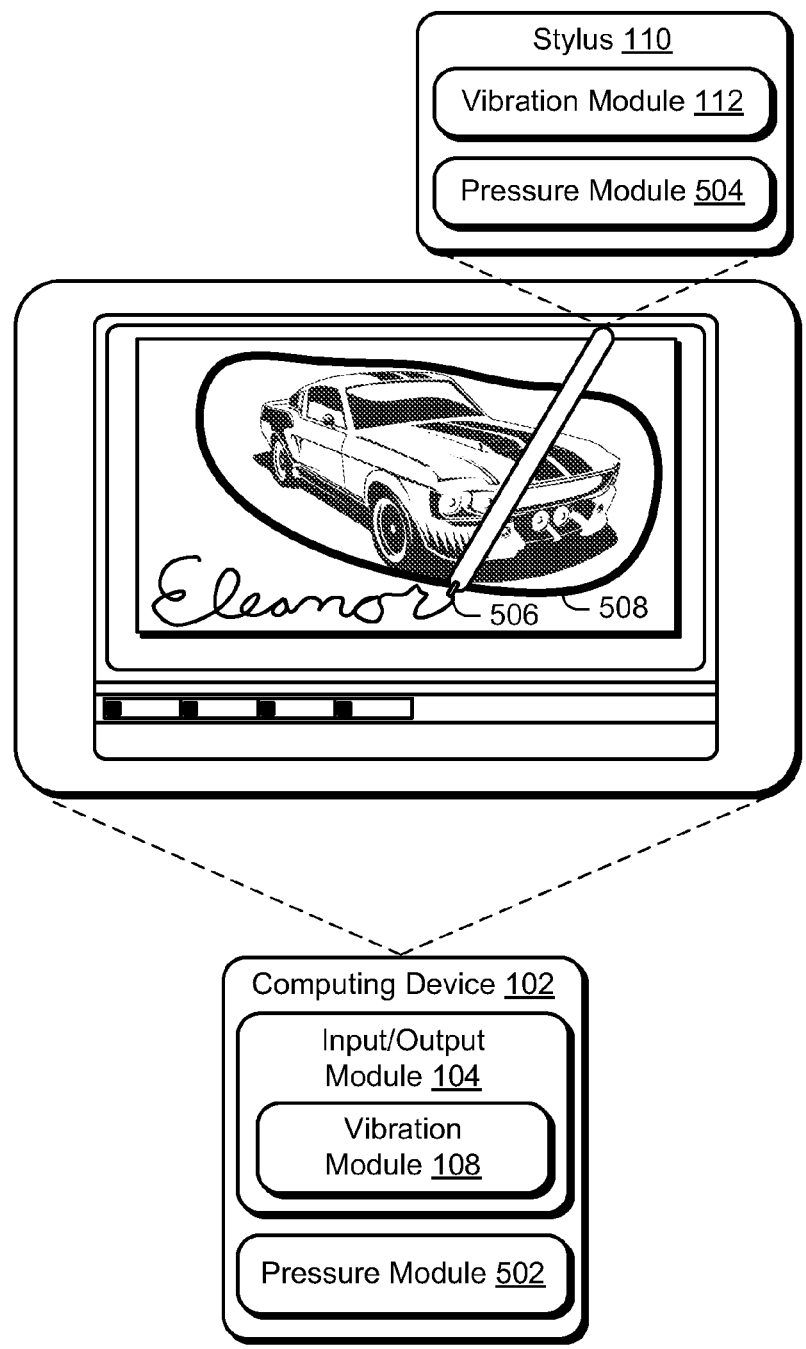
FIG. 5 depicts a system in an example implementation in which vibrations are adjustable in response to pressure of an input against a surface of the display device of the computing device.

FIG. 4 depicts a procedure 400 in an example implementation in which an effect of a vibration used to provide feedback is cancelled. During the discussion of FIG. 4, reference may also be made to a system 500 of FIG. 5. As shown in FIG. 5, in some instances, the stylus 110 and/or surface 202 of the computing device 102 may be configured to detect an amount of pressure. Examples of this functionality are represented by the pressure module 502 of the computing device 102 and the pressure module 504 of the stylus 110 in the system 500. The detection of the amount of pressure may be used to provide a variety of functionality, such as to draw a thin line 506 when detecting a lesser amount of pressure and a thicker line 508 when detecting a greater amount of pressure.

Thus, detection of the pressure by the computing device 102 and/or the stylus 110 may be leveraged to increase functionality that is available to a user of the computing device 102 and the stylus 110. However, in some instances the vibration used to provide feedback may interfere with this detection. Accordingly, in this example the effect of at least part of the vibration is cancelled.

Returning back again to FIG. 4, an input is detected that describes pressure against a surface of a computing device (block 402). The input may be detected in a variety of ways, such as at the surface 202 of the computing device 102 (e.g., from pressure applied by the stylus 110 and/or a finger of a user's hand 114), at a tip 208 of the stylus 110, and so on.

A determination is made as to an effect of vibration of the stylus or the surface on the input (block 404). For instance, a manufacturer may determine the effect through analysis of the known inputs with known vibrations to determine the effect. Therefore, the computing device 102 and/or the stylus 110 may determine the effect by "knowing" the amount of vibration, such as through a table lookup. In another instance, sensors may be used to determine the effect of the vibration to be used as a baseline for addition of the input. A variety of other instances are also contemplated.

At least part of the determined effect of the vibration is cancelled from the input (block 406). Continuing with the previous example, the determined effect may be at least partially removed from the input to arrive at an input that was intended. Thus, "noise" encountered through the vibration of the surface 202 and/or stylus 110 may be at least partially removed from the input to arrive at an intended input. One or more actions may then be identified responsive to the input having the determined effect removed (block 408), e.g., to draw a line, select a part of a user interface (e.g., via a "tap"), and so on. Thus, in this example the effect of the vibration was at least partially removed to determine an input. The vibration may also used to provide feedback based on an amount of pressure detected, further discussion of which may be found in relation to the following figure.

Figure 6:
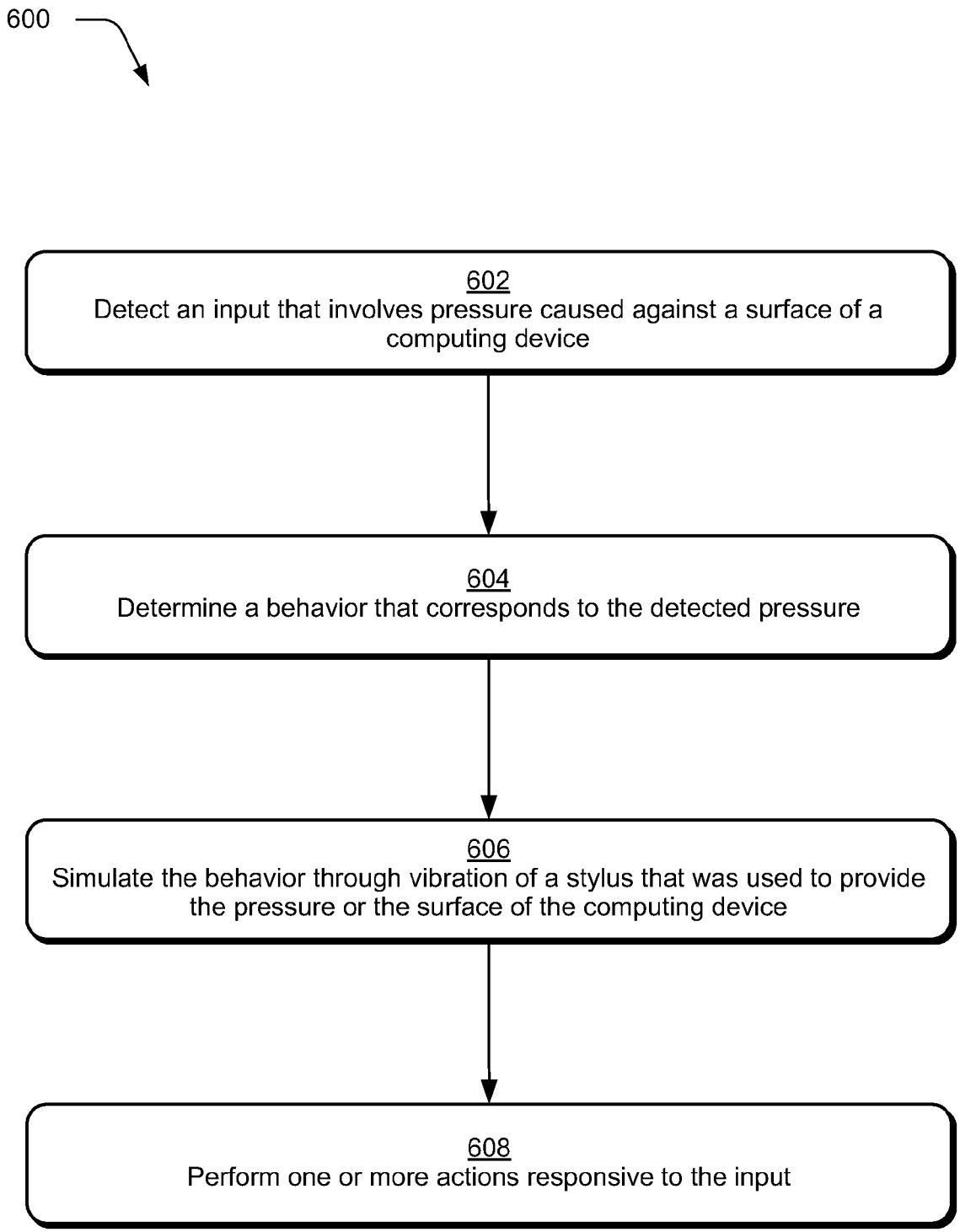
FIG. 6 depicts a procedure in an example implementation in which behavior is changed of one or more vibrations responsive to pressure applied to a surface of a computing device.

FIG. 6 depicts a procedure 600 in an example implementation in which a behavior is simulated through vibrations responsive to a detected pressure. An input is detected that involves pressure caused against a surface of a computing device (block 602). For example, the input may be caused by pressing a stylus 110 against a surface 202 of the display device 106, a finger of a user's hand 114, and so on.

A behavior is determined that corresponds to the detected pressure (block 604). Continuing with the previous example, the input may be detected to specify a width of a line through pressing a stylus 110 against the surface 202 of the display device 106 as shown in FIG. 5. The behavior may then involve simulating different amounts of resistance that are felt when drawing a thin line versus a thicker line. A variety of other behaviors are also contemplated, such as to simulate a surface when touched by the finger of the user's hand 114 (e.g., a texture), and so on.

The behavior is simulated through vibration of a stylus that was used to provide the pressure or the surface of the computing device (block 606). For instance, the surface 202 of the display device 106 may vibrate to simulate a feel of a writing surface responsive to a touch input received from the finger of the user's hand 114. Additionally, one or more actions may be performed responsive to the input (block 608), such as to draw a line, select an item in a menu, and so forth. Thus, the vibrations of the stylus 110 and/or the surface 202 of the display device 106 may be used to simulate a variety of different behaviors responsive to an input.

Example Device

Figure 7:
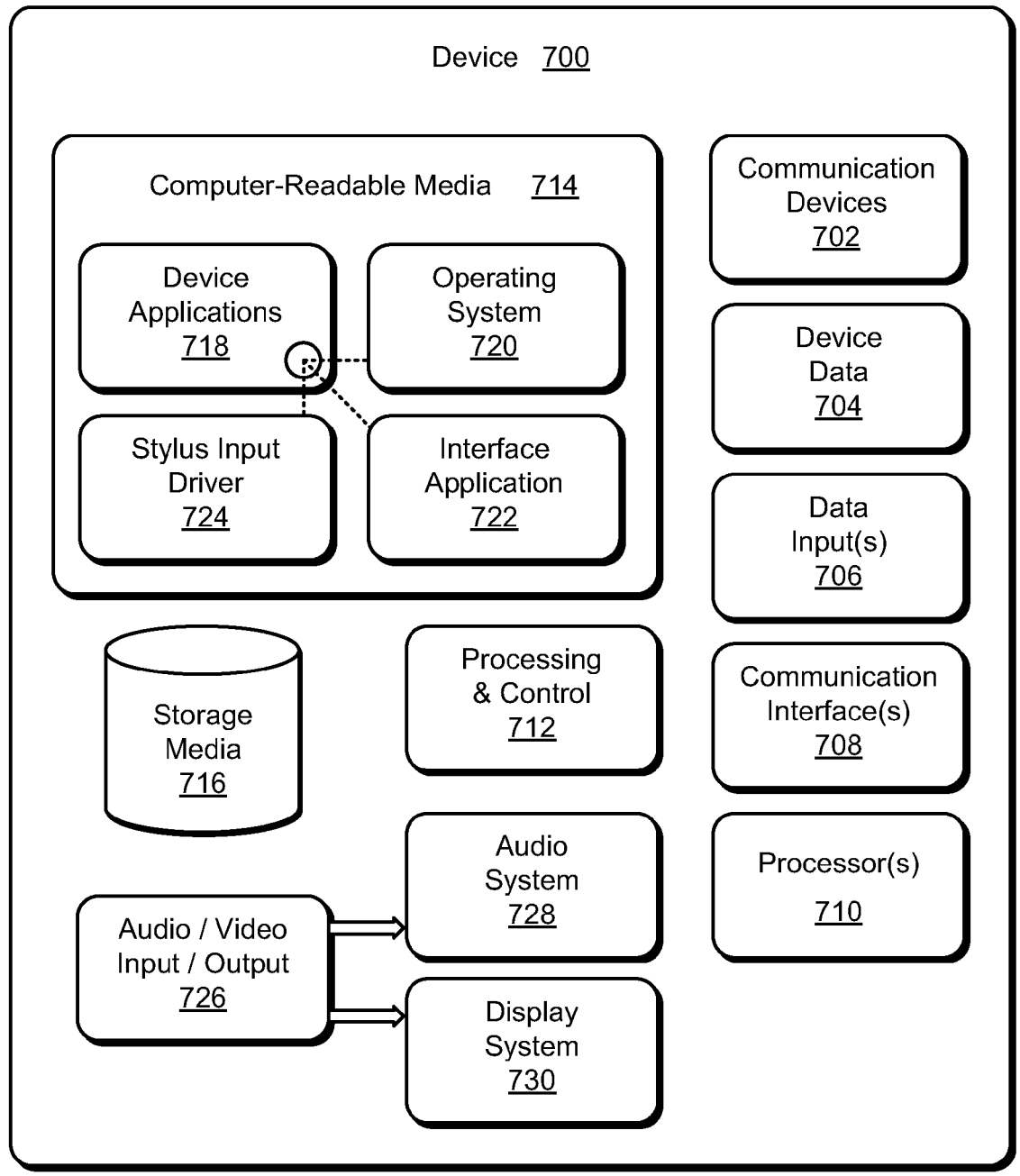
FIG. 7 illustrates various components of an example computing device in greater detail.

FIG. 7 illustrates various components of an example computing device 700 that can be implemented as any type of portable and/or computer device as described with reference to FIGS. 1 and 2 to implement embodiments of the gesture techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface (e.g., wireless to the stylus 110), a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of active vibration control. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the techniques described herein. In this example, the device applications 718 include an interface application 722 and a stylus input driver 724 that are shown as software modules and/or computer applications. The stylus input driver 724 is representative of software that is used to provide an interface with a device configured to capture inputs from the stylus 110 (or from the user's hand 114) and/or to communicate with the stylus 110, to provide the one or more inputs previously described. Alternatively or in addition, the interface application 722 and the stylus input driver 724 can be implemented as hardware, software, firmware, or any combination thereof. Additionally, the stylus input driver 724 may be configured to support multiple input devices, such as separate devices to capture touch and stylus inputs, respectively. For example, the device may be configured to include dual display devices, in which one of the display device is configured to capture touch inputs while the other stylus inputs.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more modules at least partially in hardware, the method comprising:
   receiving a selection of a type of writing surface via a first portion of a user interface or a type of writing implement via a second portion of a user interface, the selection made through interaction with the user interface; and
   simulating the selected type of writing surface or type of writing implement using vibrations of a stylus or surface of a computing device that is configured to receive one or more inputs from the stylus.

2. A method as described in claim 1, wherein the computing device is configured to receive the one or more inputs from the stylus through contact of the stylus with a display device of the computing device that includes the surface.

3. A method as described in claim 1, wherein the vibrations include at least one component that is not sinusoidal.

4. A method as described in claim 1, wherein the vibrations are provided by the stylus and not the writing surface.

5. A method as described in claim 1, wherein the vibrations are provided by both the surface and the stylus.

6. A method as described in claim 1, wherein the selection of the type of writing implement describes a feel of the type of writing implement when moving across the surface.

7. A method as described in claim 1, wherein the selection of the type of writing implement describes a texture of the type of writing surface.

8. A method as described in claim 1, wherein vibrations of the surface are used, at least in part, to simulate the selection of the writing implement.

9. A method as described in claim 1, wherein vibrations of the writing implement are used, at least in part, to simulate the selection of the surface.

10. A method implemented by one or more modules at least partially in hardware, the method comprising:
    detecting an input that involves pressure caused through pressing a stylus against a surface of a computing device;
    determining a behavior that corresponds to the detected pressure, the behavior including functionality that varies according to the detected pressure of the input; and
    responsive to the determining, simulating the behavior through vibration of the stylus or the surface of the computing device.

11. A method as described in claim 10, wherein the behavior is configured to provide feedback to a user that grasps the stylus responsive to the pressure.

12. A method as described in claim 10, wherein the surface includes at least part of a display device of the computing device.

13. A method as described in claim 10, wherein the behavior is also determined through a corresponding display element that is displayed proximal to the stylus in a user interface by a display device that includes the surface.

14. A method as described in claim 10, further comprising performing one or more actions by the computing device that correspond to the input.

15. A method as described in claim 14, wherein the one or more actions include display characteristics of a line recognized from the detected input.

16. A method comprising:
   detecting an input that describes pressure against a surface of a computing device, the input received during vibration of at least one of the stylus or the surface to provide haptic feedback;
   removing at least part of an effect of the vibration from the input thereby differentiating between the pressure associated with the detected input and the vibration providing haptic feedback; and
   identifying one or more actions to be performed by the computing device responsive to the input having at least part of the effect of the vibration removed.

17. A method as described in claim 16, wherein the pressure is caused by one or more fingers of a user's hand.

18. A method as described in claim 16, wherein the vibration is caused through movement of the surface of the computing device.

19. A method as described in claim 16, wherein the vibration is configured to provide feedback responsive to the pressure.

20. A method as described in claim 16, further comprising performing the one or more actions in conjunction with a user interface output by the computing device.

* * * * *

UNITED STATES PATENT AND TRADEMARK OFFICE
CERTIFICATE OF CORRECTION

PATENT NO. : 8,416,066 B2  
APPLICATION NO. : 12/770392  
DATED : April 9, 2013  
INVENTOR(S) : Westerinen et al.

It is certified that error appears in the above-identified patent and that said Letters Patent is hereby corrected as shown below:

In the Specification

Column 3, line 10, delete "described," and insert -- described --, therefor.

Signed and Sealed this
Tenth Day of February, 2015

Michelle K. Lee
*Deputy Director of the United States Patent and Trademark Office*